United States Patent [19]

Hine, Jr.

[11] 3,937,374
[45] Feb. 10, 1976

[54] PANNIER BAG CONSTRUCTION AND METHOD OF ATTACHMENT

[75] Inventor: Edward K. Hine, Jr., Boulder, Colo.

[73] Assignee: Hine-Snowbridge, Inc., Boulder, Colo.

[22] Filed: Oct. 21, 1974

[21] Appl. No.: 516,547

[52] U.S. Cl. .............................................. 224/32 A
[51] Int. Cl.² ........................................... B62J 9/00
[58] Field of Search ........ 224/32 R, 32 A, 39 R, 31, 224/43, 44

[56] References Cited
UNITED STATES PATENTS 3,786,972   1/1974   Alley .............................. 224/32 A

FOREIGN PATENTS OR APPLICATIONS 1,102,369   6/1954   France ........................... 224/32 R
759,958   12/1933   France ........................... 224/32 R Primary Examiner—Robert R. Song
Attorney, Agent, or Firm—Thomas W. O'Rourke

[57] ABSTRACT

A pannier bag having means for attachment to a bicycle carrier which means include fasteners on the pannier bag for engagement with the upper portion of a bicycle carrier and, at the lower portion of the pannier bag, resilient members secured to the pannier bag adjacent the side edges thereof and a hook or other fastening member intermediate the resilient members, whereby the normally horizontal resilient members may be distended downwardly to securely fasten to a complementary member on the bicycle, thereby securely tensioning the upper fastener and the lower fastening member, the pannier bags further, when utilized in pairs, being joinable as a single luggage structure and having an unobstructed inner pocket adjacent the attachment means.

13 Claims, 7 Drawing Figures

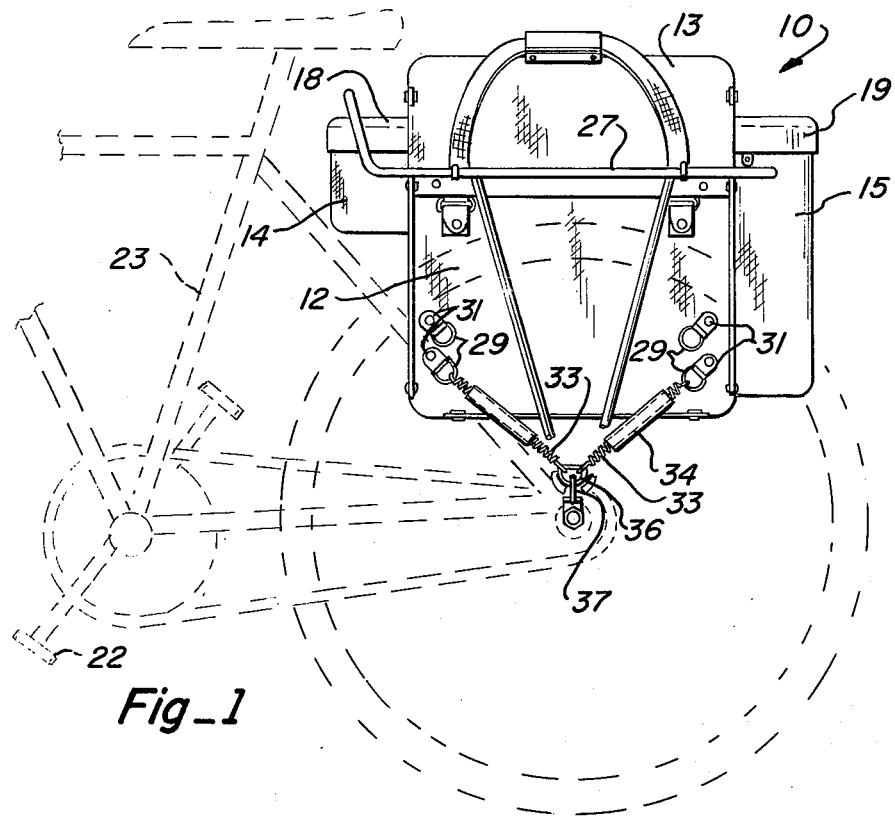
Fig_1
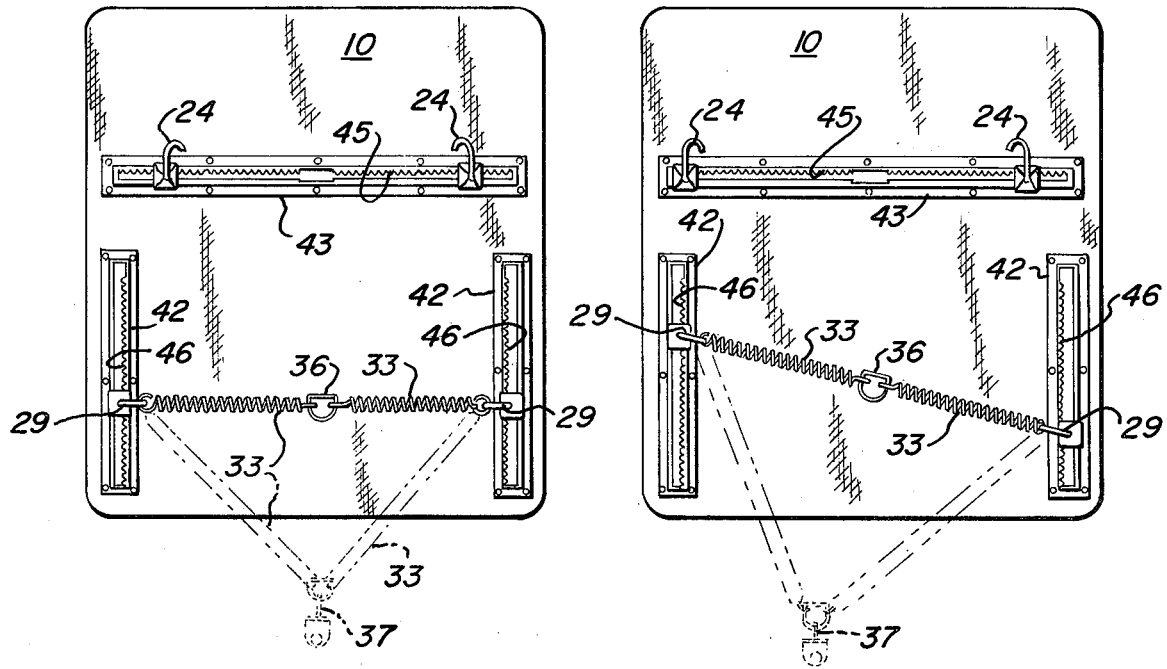
Fig_2     Fig_3

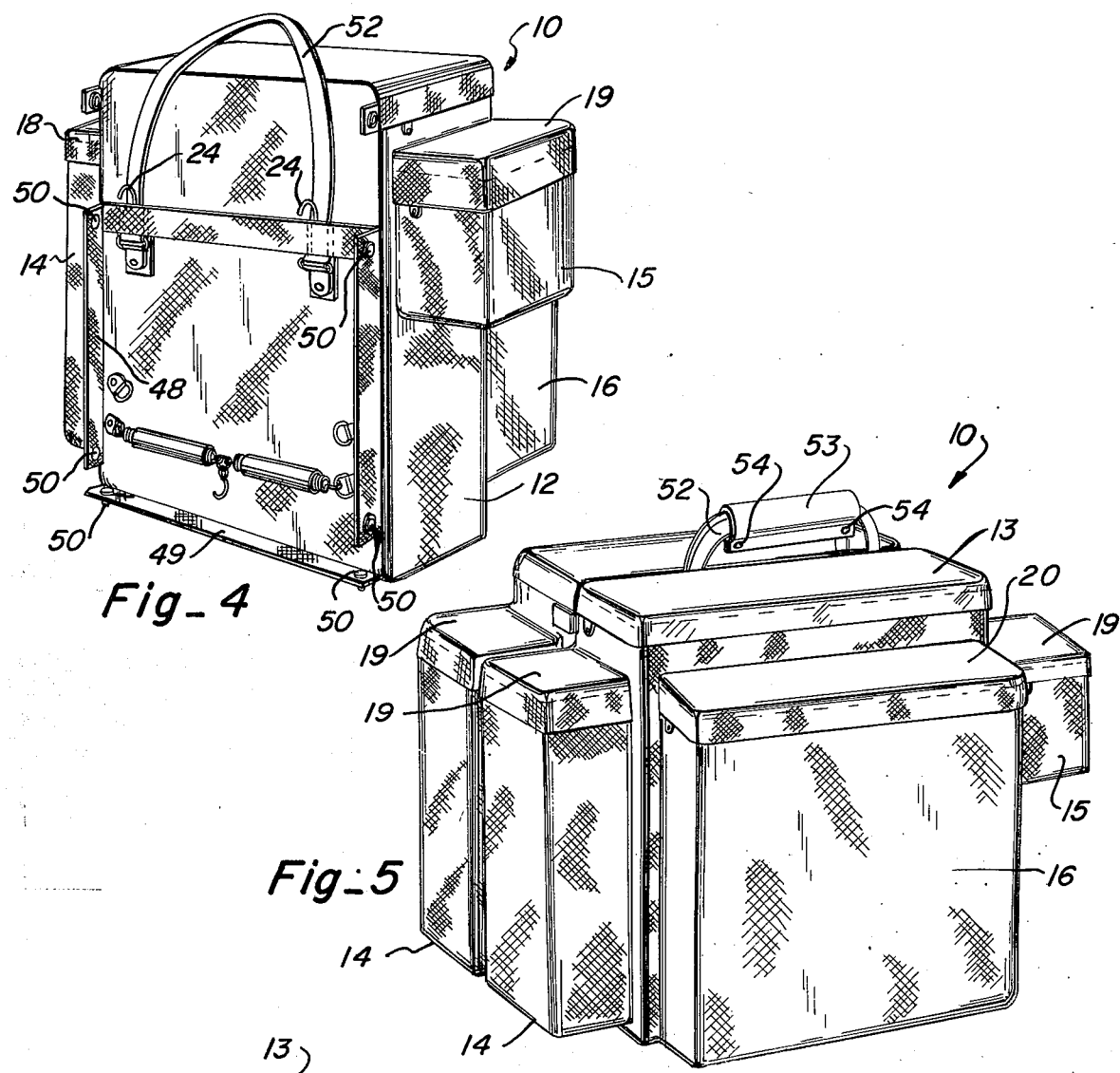
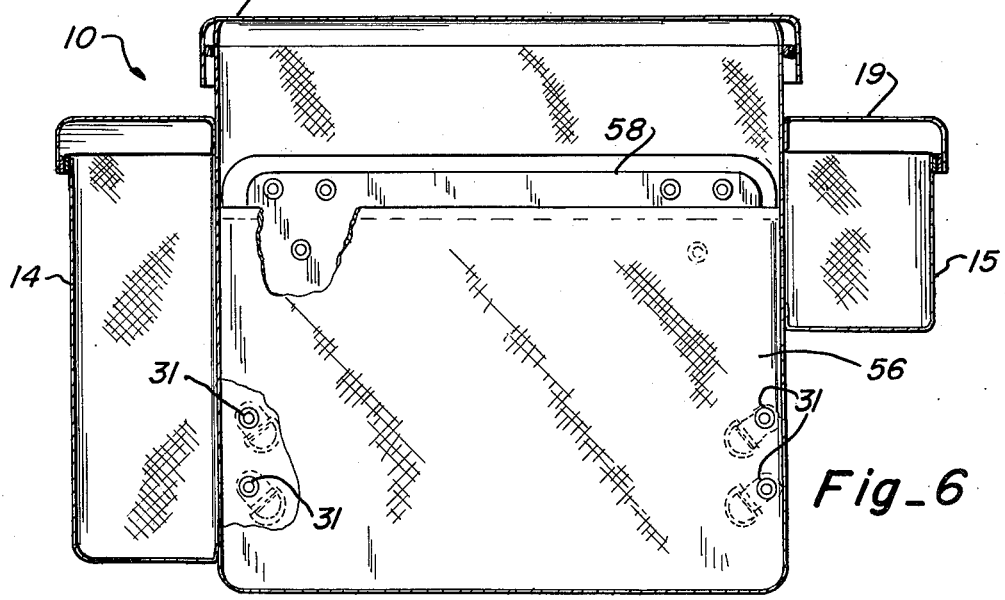

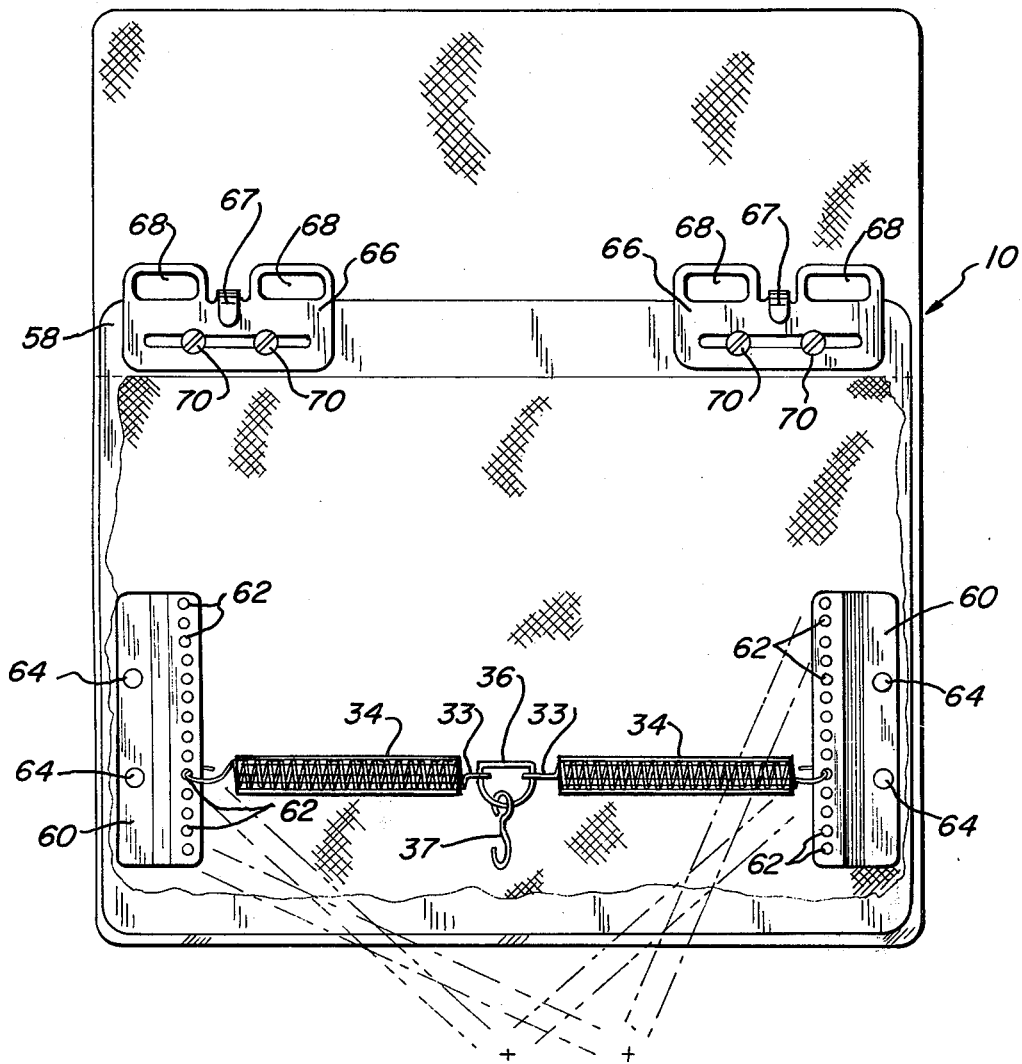
Fig_7

PANNIER BAG CONSTRUCTION AND METHOD OF ATTACHMENT

BACKGROUND OF THE INVENTION

1. Field of the Invention

The present invention relates generally to pannier bags for bicycles and more particularly to an improved, particularly advantageous attachment structure for securing a pannier bag to a bicycle carrier.

2. Description of the Prior Art

Pannier bags for attachment, preferably in pairs, to a rear carrier of a bicycle have been known for quite some time. A particularly useful arrangement previously known is that described in U.S. Pat. No. 3,786,972, issued Jan. 22, 1974, to Hartley R. Alley. In this arrangement, two hook members at the upper back portion of a pannier bag are secured to a bicycle carrier above the rear wheel. A vertical spring member, located by an overlay strap at the back bottom portion of the pannier bag and attached to the central back area of the pannier bag, is linearly distended to attach at a lower portion of the carrier adjacent the hub of the bicycle. Thus, the spring tensions the upper hooks and provides an attachment to the carrier.

Further, the configuration taught by Alley is such that two pannier bags may be attached together by securing means provided on the backs of the pannier bags to form a luggage member. Other attachment means, i.e., to back packs, etc., are also disclosed.

In use, while the Alley type pannier bag is well designed and well accepted, the portion of the vertical spring extending from the bottom of the pannier bag to the lower portion of the carrier is not stabilized with regard to horizontal movement. Thus, when riding over rough terrain, oscillations of the pannier bags can be induced which, in certain instances, may cause inadvertent release of the bags. Further, since even in the unstressed position, the spring of the Alley pannier bag extends below the bottom edge of the pannier bag, it is necessary that the means securing two pannier bags together to form a unitary luggage unit seal the bottom interface between the bags to contain the spring and avoid possible snagging. The fact that the spring must be moved out of the way when such interfacing is accomplished lends to the inconvenience of the operation.

Finally, since the spring of the Alley pannier bag is mounted centrally in the back of the bag, the loop adjacent the bottom of the pannier bag can be attached in one of two ways. It may be merely sewn to the material of the bag, as disclosed in the patent, which is a somewhat marginal attachment means relative to the forces induced on the loop. Alternatively, it may be riveted into the stiffener member commonly provided inside pannier bags to transmit stresses, in which case the pocket provided inside the pannier bag to receive the stiffener is obstructed with regard to storage of, for instance, maps.

Summarily, while the Alley-type pannier bag represents a well received and quality construction relative to the art of pannier bag construction, certain drawbacks and disadvantages do exist.

SUMMARY OF THE INVENTION

The present invention, which provides a heretofore unavailable improvement over previous pannier bag constructions, comprises a pannier bag in which the tensioning means of the attachment structure comprises normally aligned positioned resilient members across the back portion of the pannier bag which may be distended to secure a pannier bag to a bike carrier. As a result of the normally horizontal placement of the resilient members, direct location of the pannier bag in a horizontal direction is provided by the resilient members as well as vertical tensioning for attachment. In a particularly desirable embodiment, the position of the mounting points of the attachment structure may be selectively configured to accommodate various carrier structures.

Accordingly, an object of the present invention is to provide a new and improved configuration and method for attaching a pannier bag to bicycle carriers.

Another object of the present invention is to provide a new and improved structure and method for a pannier bag in which the tensioning means is, in the unstressed state, entirely within the back side of the pannier bag to facilitate attachment of two pannier bags into a unitary luggage piece.

Yet another object of the present invention is to provide a new and improved structure and method for a pannier bag in which the stressed members of the attachment means may be directly riveted to a stiffening member without obstructing the central portion of the interior pocket which receives the stiffening member.

Still another object of the present invention is to provide a new and improved pannier bag attachment means and method in which the attachment members may be adjusted for even tension for various types and sizes of bicycle carrier configurations.

These and other objects and features of the present invention will become apparent from the following description.

BRIEF DESCRIPTION OF THE DRAWINGS

In the drawings:

FIG. 1 is an elevational view illustrating a pannier bag according to the instant invention fastened to a bicycle carrier with the bicycle represented in a ghosted manner;

FIGS. 2 and 3 are simplified rear view illustrations of an alternative embodiment of a pannier bag according to the instant invention;

FIG. 4 is a rear perspective view of a pannier bag according to the instant invention;

FIG. 5 is a perspective view of two pannier bags according to the instant invention joined to form a unitary piece of luggage;

FIG. 6 is a rear sectional view of a pannier bag according to the instant invention specifically illustrating the support attachment points relative to the internal pannier bag pocket and stiffener member; and FIG. 7 is a partially cutaway, simplified rear view of an alternative embodiment of the instant invention.

DETAILED DESCRIPTION OF THE INVENTION

Referring now to the drawings, wherein like components are designated by like reference numerals throughout the various figures, a pannier bag according to the instant invention is shown in FIGS. 1 and 4 and generally designated by reference numeral 10. Pannier bag 10 is primarily formed of a pliable fabric which is waterproof, or at least water-resistant, and of substantial strength. A relatively heavy, coated nylon or canvass are examples of such material.

As illustrated, pannier bag 10 is comprised of a main compartment 12 having a cover 13 removably attached at three sides of the upper opening of main compartment 12. In order to assist in organization of contents and to permit easy access, a number of pockets are sewn to the exterior of main compartment 12. Forward pocket 14, rear pocket 15 and front pocket 16 are examples of such additional storage areas and are covered by flaps 18, 19 and 20, respectively. Cover 13 and flaps 18, 19 and 20 are generally closeable by zippers protected from the elements. It will be noted that a pair of pannier bags, as in FIG. 5, are not identical but, rather, are constructed as mirror images of each other. This is a result of the desirability of forward-facing pocket 14 being somewhat smaller to permit clearance for peddle 22.

On the back wall of pannier bag 10, fasteners, in the form of hooks 24, are riveted to a stiffner member 58 as will be discussed below. Hooks 24 engage horizontal member 26 of carrier 27 as will be apparent from FIG. 1. The relationship of carrier 27 to ghosted bicycle 23 is also apparent. At the lower side portion of the back of pannier bag 10, D-rings 29 are secured by means of rivets 31. Resilient members 33 having protective covers 34 of, for instance, vinyl tubing to prevent marring are connected to two opposed D-rings 29. Resilient members 33 are joined by D-ring 36 which carries hook member 37. Thus, when attached to carrier 27, resilient members 33 are distended in a direction substantially perpendicular to the unstressed orientation of resilient members 33 and hook member 37 is secured in a hole (not shown) defined in the lower portion of carrier 27 adjacent the rear hub assembly 40 of ghosted bicycle 23.

As will be apparent from FIG. 1, pannier bag 10 is stabilized in both the vertical and horizontal directions as a result of the orientation of distended resilient members 33 which form an angular configuration as opposed to a linear arrangement. The angular configuration dampens forces which would tend to establish oscillations of pannier bag 10.

While resilient members 33 are illustrated as metal springs, it is to be understood that rubber straps, elastic cords and other such materials could be employed. Also, though two springs are illustrated, a single resilient member 33 extending between D-rings 29 with hook member 37 attached along the length of such single resilient member 33 would, of course, also provide the described advantages.

A number of spaced D-rings 29 are provided on the back of pannier bag 10 in order that various configurations of carrier 27 may be accommodated. However, in a particularly useful embodiment of the invention, as illustrated in FIGS. 2 and 3, completely adjustable hooks 24 and D-rings 29 are provided by utilizing side channel members 42 along the lower sides of pannier bag 10 and top channel member 43 disposed horizontally across the back of pannier bag 10. D-rings 29 and hooks 24 are slideably secured within channel members 42 and 43, respectively, and movable longitudinally along the lengths thereof. With reference to top channel member 43, it will be noted that a serrated edge 45 is provided along the upper edge of channel member 43. Accordingly, though hooks 24 are movable along channel member 43, a force applied to hooks 24 will engage and maintain hooks 24 in a depression in serrated edge 45.

Similarly, serrated edges 46 are provided in channel member 42 to maintain movable D-rings 29 when positioned at a given location along side channel member 42 and biased inwardly by an applied force towards serrated edges 46. Thus, D-rings 29 may be positioned symmetrically, as shown in FIG. 2, to provide a configuration similar to that of FIG. 1 in which D-rings 29 are fixed by rivets 31. By positioning D-rings 29 equally upwardly or downwardly inside channel members 42, the tension on resilient members 23 may be adjusted. In the event that carrier 27 requires other than symmetrical placement of pannier bag 10, the relationship of D-rings and side channel members 42 may be altered, as shown in FIG. 3, to accommodate the displaced attachment point to carrier 27. Similarly, hooks 24 may be positioned as desired along serrated edge 45 of top channel member 43 to accommodate various configurations of carrier 27.

Connecting means are provided on the back of pannier bag 10 to join a pair of pannier bags 10 into a unitary piece of luggage. Specifically, as shown in FIG. 4, side strips 48 and bottom strip 49 are attached along the rear, side and bottom peripheries of pannier bag 10. Snaps 50, male on one pannier bag 10 and female on the other pannier bag 10, are provided in order that the two pannier bags 10 may be joined, as shown in FIG. 5, to form a unitary piece of luggage. Each pannier bag 10 has a handle strap 52 which, when joined, as shown in FIG. 5, extends upwardly to provide convenient purchase for carrying. A grip 53 encircles the handle straps 52 and is secured therearound by snaps 54 to provide an even more convenient grasp. Normally, grip 53 is sewn to a handle strap 52 of one of the two pannier bags 10 forming the unitary piece of luggage.

Though snaps are preferred as the joining means between pannier bags 10, for reasons of convenience and economy, obviously, zippers, VELCRO strips or other such conventional means may also be used to form the unitary piece of luggage from two pannier bags 10, as illustrated in FIG. 5.

As illustrated in FIG. 6 with regard to the attachment of D-rings 29 by means of rivets 21, but also applicable to the use of side channel members 42, as shown in FIGS. 2 and 3, an interior pocket flap 56 is provided to receive stiffener member 58. Stiffener member 58, which may be a light, planar piece of aluminum, fiberboard or other such material, is preferably utilized inside the rear, inside portion of pannier bg 10 to maintain the shape of the bag and transmit the stresses between hooks 24 and resilient members 33 without substantially distorting pannier bag 10. Generally, D-rings 29, or side channel members 42, will be riveted directly to stiffener member 58 as will hooks 24. While hooks 24 present no problem in that they are usually located towards the upper portion of rigid member 58, and particularly towards the upper portion of pocket flap 56, the lower members are more troublesome in that the rivet must be placed through pocket flap 56 if conventional riveting apparatus is employed. Thus, by locating D-rings 29 towards the edge of pannier bag 10, rivets 31 may be placed through pocket flap 56 without substantially obscuring or compromising the function of the pocket formed by pocket flap 56. Maps and other such materials can be easily inserted between pocket flap 56 and rigid member 58.

The alternative embodiment illustrated in FIG. 7 is functionally equivalent to the previously-described embodiments, particularly the embodiments of FIGS. 2 and 3, but is particularly preferred for simplicity and ease of manufacture. The illustration is partially cut away to expose stiffener member 58 located in the rear portion of pannier bal 10. Plates 60, having the series of holes 62 defined therein, are attached through the back fabric of pannier bag 10 to stiffener member 58 by rivets 64, and are located in mirror image relationship on the opposite lower portion of pannier bag 10. The portions of plates 60 in which holes 62 are defined are raised from the back wall of pannier bag 10. The portions of plates 60 through which rivets 64 extend are flush with the back wall and, except for the rear fabric of pannier bag 10, adjacent stiffener member 58. Accordingly, holes 62 provide a wide range of adjustment for attachment of resilient members 33 in various configurations and tensions. Hook member 37 is thus adjustable to numerous loci with equal tension in resilient members 33.

At the upper portion of the rear of pannier bag 10, upper members 66 having hooks 67 formed thereon and openings 68 defined therein are attached to stiffener member 58 by means of releasable fasteners 70. Openings 68 are adapted to receive the handle strap thereby avoiding the need to sew handle straps 52 into the fabric or attach handle straps 52 by means of rivets as shown, for instance, in FIG. 4. Since upper members 66 can be readily moved laterally by loosening releasable fasteners 70, substantial adjustment is provided.

The plates 60 and upper members 66 of the embodiment of FIG. 7 can be readily produced by stamping and/or simple punching of extruded profiles.

Summarily, the pannier bag of the instant invention provides, as a result of the utilization of a normally horizontal — in the undistended position and with reference to the conventional mounting attitude of the pannier bag — resilient members, a stable, more secure attachment of the pannier bag to a bicycle carrier. Further, the attachment of the resilient members provides for containment of the resilient members in the undistended position between two pannier bags when such pannier bags are joined to form a unitary piece of luggage. The advantageous location of the attachment of the resilient members to the stiffener member in the pannier bag permits the interior back pocket to be unobstructed by rivets or other fastening means. This is in contrast to prior art pannier bags utilizing centrally-located attachment points which either obstruct the pocket or do not attach to the stiffener member.

Although only several embodiments of the present invention have been illustrated and described, it is anticipated that various changes and modifications will be apparent to those skilled in the art and that such changes may be made without departing from the scope of the invention as defined by the following claims.

What is claimed is:

1. A pannier bag, comprising: a bag structure having a rigid back wall; at least one downwardly-oriented upper hook member secured to the rear portion of the bag at the rigid back wall; a plurality of attachment points secured to the rear portion of the bag at the rigid back wall; at least one resilient member having at each end releasable securing means engaging one attachment point, the two attachment points engaged by the securing means being adjacent opposed sidewalls; and lower attachment means adapted to be secured to a lower portion of a bicycle carrier assembly and carried by the resilient member intermediate the attachment points of the resilient member to the rigid back wall, whereby the upper hook member may be secured to the upper portion of a bicycle carrier assembly and, upon downward distension of the resilient member, the attachment means secured to the lower portion of the bicycle carrier assembly to provide a stabilized attachment of the pannier bag to the bicycle carrier assembly.

2. A pannier bag as set forth in claim 1 in which a pair of upper hook members are secured to the rigid back wall and both spaced a substantially equal distance from the top edge of the bag.

3. A pannier bag as set forth in claim 2 in which the upper hook members are releasably secured to the rigid back wall by means of a channel member having a channel opening defined therein and slidably carrying the hook members for transverse adjustment across the back of the pannier bag, the channel opening being defined on the upper side by an edge having a series of detents defined therein to receive and secure the hook members.

4. A pannier bag as set forth in claim 2 in which the upper hook members are secured by releasable fasteners and mounted for transverse adjustment upon loosening of the releasable fasteners.

5. A pannier bag as set forth in claim 1 in which the resilient member comprises a pair of springs with one each of the springs being attached at an opposed outer edge of the rigid back member and each of the springs being attached at the other end to a common member carrying the attachment means.

6. A pannier bag as set forth in claim 1 in which a series of D-rings are mounted adjacent each lower side edge of the rigid member and comprise the attachment points to which the resilient member may be selectively secured on each side of the rigid back wall.

7. A pannier bag as set forth in claim 1 in which the attachment points comprise a pair of movable D-rings mounted one each in a channel defined in a channel member attached to the rigid rear back wall on each lower side of the rigid back wall with the channel members being oriented substantially parallel to the side edges of the rigid back wall, the D-rings being movable within the channels and being secured by tension by means of a series of detents defined in the inner edge of the channel.

8. A pannier bag as set forth in claim 1 in which the attachment points comprise a pair of plate members mounted adjacent the lower side edges of the rigid back wall, each plate member having opposed inner raised sections with a series of holes defined therein and oriented in an arrangement substantially parallel to the edge of the rigid back wall, whereby the resilient member may be selectively configured by attaching the ends thereof to one hole in each plate.

9. A pair of pannier bags, each comprising: a bag structure having a rigid back wall; upperr attachment means adapted to be secured to the upper portion of a bicycle carrier; at least one resilient member disposed transversely across the rear portion of the bag and secured to the rigid back wall at one of a plurality of selectively engageable attachment points adjacent each side edge of the rigid back wall; attachment means carrier intermediately on the resilient member adapted to be secured to the lower portion of a bicycle carrier; and releasable interlocking means secured to the back side of the bag adapted to secure one bag to the other bag to form a unitary piece of luggage, whereby each bag may be secured to a bicycle carrier by engaging the upper attachment means, distending the resilient member downward and securing the lower attachment means in a stable biased manner, or, alternatively, the bags may be secured together to form a unitary piece of luggage with the distendable resilient member being positioned across the back side of each bag.

10. A pair of pannier bags as set forth in claim 9 in which each bag includes a handle strap secured to the back upper side of the bag.

11. A pair of pannier bags as set forth in claim 10 in which the handle strap is attached at each end to an opening defined in a plate member, the plate member also carrying the upper attachment means and being secured to the rigid back wall.

12. A pair of pannier bags as set forth in claim 10 in which the handle strap on one pair of bags includes fastening means to secure the two handle straps together.

13. A pair of pannier bags as set forth in claim 9 in which the releasable interlocking means on the back of the bags are male snap members on one bag and female snap members on the other bag.

* * * * *

UNITED STATES PATENT OFFICE
CERTIFICATE OF CORRECTION

PATENT NO. : 3,937,374
DATED : February 10, 1976
INVENTOR(S) : Edward K. Hine, Jr.

It is certified that error appears in the above-identified patent and that said Letters Patent are hereby corrected as shown below:

Column 4, line 48, delete "bg" and substitute --bag--.

Column 6, line 56, delete "upperr" and substitute --upper--.

Column 6, line 63, delete "carrier" and substitute --carried--.

Signed and Sealed this twentieth Day of April 1976

[SEAL]

Attest:

RUTH C. MASON
Attesting Officer

C. MARSHALL DANN
Commissioner of Patents and Trademarks